United States Patent
Nakamura (10) Patent No.: US 9,670,863 B2
(45) Date of Patent: Jun. 6, 2017

(54) APPARATUS AND METHOD FOR CONTROLLING INTERNAL-COMBUSTION ENGINE

(71) Applicant: Hitachi Automotive Systems, Ltd., Hitachinaka-shi, Ibaraki (JP)

(72) Inventor: Yoshitatsu Nakamura, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 839 days.

(21) Appl. No.: 13/834,938

(22) Filed: Mar. 15, 2013

(65) Prior Publication Data
US 2014/0026860 A1    Jan. 30, 2014

(30) Foreign Application Priority Data
Jul. 24, 2012   (JP) .................................. 2012-163521

(51) Int. Cl.
*F02D 41/30*     (2006.01)
*F02D 41/34*     (2006.01)
(Continued)

(52) U.S. Cl.
CPC ........... *F02D 41/30* (2013.01); *F02D 33/006* (2013.01); *F02D 41/34* (2013.01); *F02B 31/06* (2013.01);
(Continued)

(58) Field of Classification Search
CPC ....... Y02T 10/44; Y02T 10/125; F02D 41/40; F02D 41/401; F02D 2200/0406; F02D 41/30; F02D 33/006; F02D 41/34
See application file for complete search history.

(56) References Cited

U.S. PATENT DOCUMENTS 4,512,318 A * 4/1985 Ito ......................... F02D 41/107
                                                                        123/492
5,211,150 A * 5/1993 Anzai ..................... F02D 41/32
                                                                        123/478
(Continued)

FOREIGN PATENT DOCUMENTS

JP     63-18766 Y2    5/1988
JP     5-222998 A     8/1993
(Continued)

OTHER PUBLICATIONS

Japanese Office Action issued in Japanese Application No. 2012-163521 dated Nov. 10, 2015 with partial English translation (six pages).

*Primary Examiner* — Sizo Vilakazi
(74) *Attorney, Agent, or Firm* — Crowell & Moring LLP (57) ABSTRACT

An apparatus and a method control an internal-combustion engine with a fuel injection valve for injecting fuel into an inlet port. In fuel injection control, injection field pressure at injection start timing is estimated from engine rotation speed and injection starting timing of the fuel injection valve. Since flow rate of the fuel injection valve fluctuates when a fuel accumulating space between a valve body and injection holes of the fuel injection valve changes by injection field pressure, a correction value to correct flow rate fluctuations is calculated based on injection field pressure at injection start timing. Fuel injection by the fuel injection valve is controlled by setting the result of adding the correction value to an injection pulse width calculated from intake air flow, engine rotation speed, etc., to final injection pulse width. Air-fuel ratio error is thereby reduced even when injection field pressure at injection timing changes.

11 Claims, 6 Drawing Sheets

(51) Int. Cl.
*F02D 33/00* (2006.01)
*F02B 31/06* (2006.01)
*F02D 13/02* (2006.01)

(52) U.S. Cl.
CPC ...... *F02B 2275/48* (2013.01); *F02D 13/0223* (2013.01); *F02D 2200/0406* (2013.01); *F02D 2200/0602* (2013.01); *Y02T 10/125* (2013.01); *Y02T 10/42* (2013.01); *Y02T 10/44* (2013.01)

(56) References Cited

U.S. PATENT DOCUMENTS

| | | | | |
|---|---|---|---|---|
| 5,249,130 | A * | 9/1993 | Mamiya | F02D 41/0025 123/681 |
| 2001/0003979 | A1 * | 6/2001 | Oki | F02D 41/0032 123/520 |
| 2003/0037771 | A1 * | 2/2003 | Yuya | F02D 41/009 123/491 |
| 2004/0149268 | A1 | 8/2004 | Hasegawa et al. | |
| 2005/0022503 | A1 * | 2/2005 | Miura | F02D 41/0002 60/274 |
| 2005/0229909 | A1 * | 10/2005 | Nakazawa | F02D 13/0261 123/568.14 |
| 2007/0062470 | A1 * | 3/2007 | Ashizawa | F02B 23/101 123/90.15 |
| 2011/0184632 | A1 * | 7/2011 | Kang | F02D 41/0007 701/109 |
| 2012/0143477 | A1 * | 6/2012 | Ruona | F02D 35/024 701/103 |
| 2014/0230793 | A1 * | 8/2014 | Mashiki | F02D 41/3094 123/478 |

FOREIGN PATENT DOCUMENTS

| | | |
|---|---|---|
| JP | 7-63087 A | 3/1995 |
| JP | 7-259620 A | 10/1995 |
| JP | 2005-320900 A | 11/2005 |
| JP | 4050229 B2 | 2/2008 |
| JP | 2009-203867 A | 9/2009 |

* cited by examiner

INCREASE IN NEGATIVE PRESSURE

APPARATUS AND METHOD FOR CONTROLLING INTERNAL-COMBUSTION ENGINE

BACKGROUND OF THE INVENTION

1. Field of the Invention

The present invention relates to an apparatus and to a method for controlling an internal-combustion engine including a fuel injection valve that injects a fuel into an inlet port.

2. Description of Related Art

Japanese Laid-open (Kokai) Patent Application Publication No. 7-259620 discloses a fuel injection device including a unit that delays an injection ending timing of a fuel injection valve from before opening an intake valve to after opening the intake valve.

An injection field pressure of the fuel injection valve fluctuates in time sequence due to intake pulsation. Thus, when an injection timing of the fuel injection valve is changed, an injection field pressure at the injection timing changes.

When the injection field pressure at the injection timing changes, a state of fuel accumulating space between a valve body and injection holes of the fuel injection valve changes, so that a fuel injection amount of the fuel injection valve increases or decreases, and an air-fuel ratio error occurs.

SUMMARY OF THE INVENTION

Therefore, an object of the invention is to provide an apparatus and a method for controlling an internal-combustion engine, capable of suppressing an occurrence of an air-fuel ratio error even when an injection field pressure at an injection timing changes.

In order to achieve the above object, the apparatus for controlling an internal-combustion engine according to the invention includes a control unit that changes a command signal input to a fuel injection valve according to an injection field pressure at an injection timing of the fuel injection valve.

In addition, the method for controlling the internal-combustion engine according to the invention detects an injection field pressure at an injection timing of a fuel injection valve, and changes a command signal input to the fuel injection valve in response to the injection field pressure.

Other objects and features of aspects of this invention will be understood from the following description with reference to the accompanying drawings.

DESCRIPTION OF THE PREFERRED EMBODIMENTS

Figure 1:
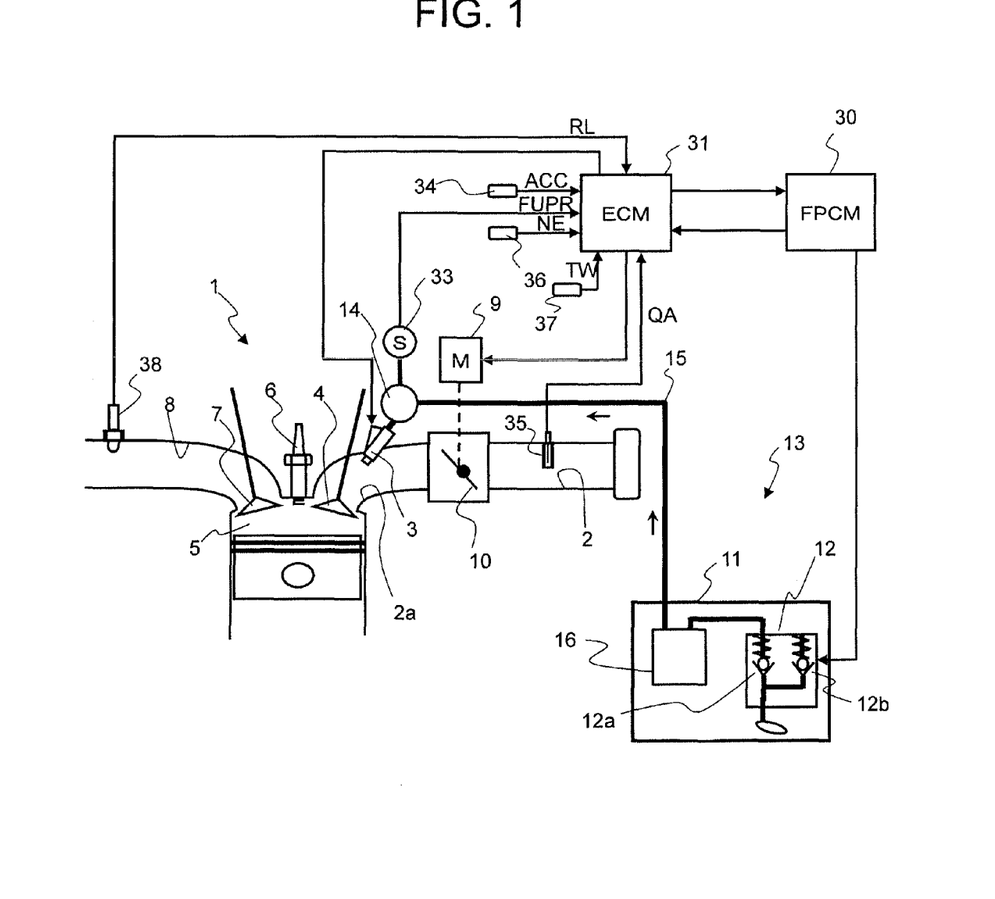
FIG. 1 is a schematic configuration view illustrating an internal-combustion engine according to an embodiment of the invention.

FIG. 1 is a schematic configuration view illustrating an example of an internal-combustion engine for a vehicle to which an apparatus according to the invention is applied.

An internal-combustion engine 1 illustrated in FIG. 1 includes an inlet port 2a which branches off from an inlet pipe 2 and is connected to a combustion chamber of each cylinder. A fuel injection valve 3 is disposed in inlet port 2a, and injects a fuel into inlet port 2a.

A fuel injected by fuel injection valve 3 is drawn into a combustion chamber 5 via an intake valve 4, and burns by spark ignition from a spark plug 6. Combustion gas within combustion chamber 5 is discharged to an exhaust pipe 8 via an exhaust valve 7.

An electronic control throttle 10 operated by a throttle motor 9 is disposed in inlet pipe 2, and electronic control throttle 10 adjusts an intake air amount of internal-combustion engine 1.

In addition, internal-combustion engine 1 includes a fuel supply system 13 that pumps a fuel within a fuel tank 11 toward fuel injection valve 3.

Fuel supply system 13 includes fuel tank 11, a fuel pump 12, a fuel gallery pipe 14, a fuel supply pipe 15, a fuel filter 16, and the like.

Fuel pump 12 is a pump operated by a motor, and is disposed within fuel tank 11.

In addition, fuel pump 12 incorporates a check valve 12a that prevents a countercurrent of a discharge fuel, and a relief valve 12b that opens when a discharge pressure of fuel pump 12 exceeds an upper limit pressure, and relieves a fuel discharged by fuel pump 12 into fuel tank 11.

Check valve 12a and relief valve 12b may be separated from fuel pump 12, and be provided in midstream of fuel supply pipe 15.

One end of fuel supply pipe 15 is connected to a discharge opening of fuel pump 12, and the other end of fuel supply pipe 15 is connected to fuel gallery pipe 14.

Filter 16 that filters a fuel is provided in a portion positioned within fuel tank 11 in midstream of fuel supply pipe 15.

Each fuel injection valve 3 of each cylinder is connected to fuel gallery pipe 14.

An engine control module (ECM) 31 including a computer is provided as a control apparatus that controls a fuel injection by fuel injection valve 3, ignition by spark plug 6, an opening of electronic control throttle 10, and the like.

In addition, a fuel pump control module (FPCM) 30 including a computer is provided as a control apparatus that drives fuel pump 12.

ECM 31 and FPCM 30 may communicate with each other. A signal that indicates a duty ratio and a frequency in a PWM control of fuel pump 12, and the like are transmitted from ECM 31 to FPCM 30, and a signal that indicates a result of abnormality diagnosis, and the like are transmitted from FPCM 30 to ECM 31.

ECM 31 may include a function and a circuit served as FPCM 30, and in this case, FPCM 30 may not be provided.

ECM 31 receives an output signal from various sensors that detect an operating condition of internal-combustion engine 1.

As the various sensors, a fuel pressure sensor 33 that detects a fuel pressure FUPR (kPa) within fuel gallery pipe 14, that is, a fuel supply pressure to fuel injection valve 3, an accelerator position sensor 34 that detects a stroke amount ACC of an accelerator pedal (not illustrated), an air flow sensor 35 that detects an intake air flow QA of internal-combustion engine 1, a rotation sensor 36 that detects a rotating speed NE of internal-combustion engine 1, a water temperature sensor 37 that detects a temperature TW of coolant in internal-combustion engine 1, an air-fuel ratio sensor 38 that detects an air-fuel ratio based on an oxygen concentration in exhaust gas of internal-combustion engine 1, and the like are provided.

ECM 31 detects an operating state of internal-combustion engine 1 based on a signal output from the various sensors, and controls a fuel injection amount and an injection timing by fuel injection valve 3, an ignition timing by spark plug 6, an opening of electronic control throttle 10 according to an engine operating state.

In addition, ECM 31 sets a target value TGFUPR of the fuel pressure FUPR based on an operating condition such as an engine load, an engine speed, and an engine temperature. A duty ratio in a PWM control of fuel pump 12 is set such that the fuel pressure FUPR detected based on an output of fuel pressure sensor 33 approaches the target value TGFUPR.

In addition, ECM 31 controls a fuel injection amount and an injection timing of fuel injection valve 3 by controlling a pulse width (ms) of an injection pulse signal output to fuel injection valve 3, and controlling an output timing of the injection pulse signal.

An opening period of fuel injection valve 3 is controlled in response to a pulse width of an injection pulse signal, and fuel injection valve 3 injects a fuel at an amount proportional to the pulse width. That is, the injection pulse signal is a command signal that commands a fuel injection amount by fuel injection valve 3, and ECM 31 outputs a command signal corresponding to a pulse signal that controls an opening period of fuel injection valve 3 to fuel injection valve 3.

Figure 2:
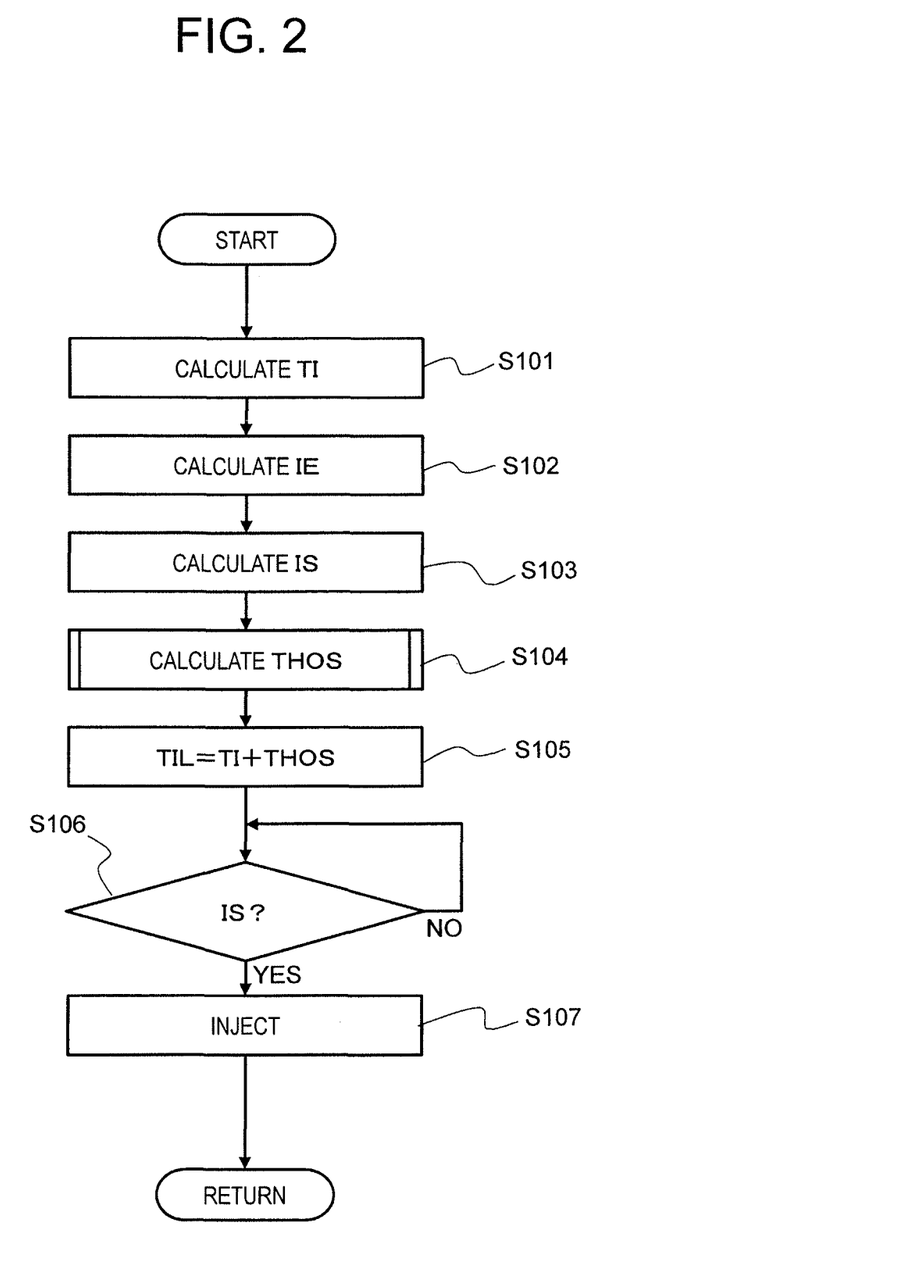
FIG. 2 is a flowchart illustrating an injection control according to the embodiment of the invention.

A flowchart of FIG. 2 illustrates a fuel injection control by ECM 31. A routine illustrated in the flowchart of FIG. 2 is executed by ECM 31 for every given period of time.

In step S101, an injection pulse width TI (ms) corresponding to a command value of a fuel injection amount is calculated based on an operating condition of internal-combustion engine 1.

An example of calculation of the injection pulse width TI is described below.

First, the intake air flow QA is detected based on an output signal of air flow sensor 35, and the engine rotation speed NE is detected based on an output signal of rotation sensor 36, thereby calculating a corresponding basic injection pulse width TP (ms) when a supply pressure of a fuel is a reference pressure based on the intake air flow QA and the engine rotation speed NE.

In addition, various correction coefficients CO for correcting the basic injection pulse width TP including a correction coefficient for responding to a change in fuel injection amount per unit time by the fuel pressure FUPR, a correction coefficient for increasing a fuel injection amount when cooling down (warm-up) the engine, a correction coefficient for causing an air-fuel ratio detected by the air-fuel ratio sensor 38 to approach a target air-fuel ratio are calculated.

The injection pulse width TI that indicates a fuel injection amount is calculated by correcting the basic injection pulse width TP using the various correction coefficients CO.

In subsequent step S102, an injection ending timing IE indicating an ending timing of a fuel injection by a crank angle position is determined.

The injection ending timing IE may be a fixed timing determined in advance, and may be set to be variable in response to an operating condition of internal-combustion engine 1. Examples of the operating condition used to determine the injection ending timing IE include an engine load, an engine rotation speed, an engine temperature, an engine start state, and whether it is an abnormal combustion.

In step S103, a crank angle position advanced from the injection ending timing IE by a crank angle corresponding to the injection pulse width TI is calculated as an injection starting timing IS.

That is, the injection pulse width TI is converted to a crank angle based on the engine rotation speed NE on that occasion, and a crank angle position advanced from the injection ending timing IE by the crank angle is set as the injection starting timing IS. Therefore, even when the injection pulse width TI changes, a fuel injection may be ended at the injection ending timing IE determined in step S102.

Subsequently, in step S104, in order to prevent an occurrence of a fluctuation of a fuel injection amount by a fluctuation of a fuel injection amount due to an injection field pressure of fuel injection valve 3 at an injection timing, a correction value THOS (ms) of the injection pulse width TI is calculated.

Since the injection field pressure fluctuates in association with an intake pulsation, an injection field pressure at an injection timing varies when the injection timing varies. In addition, even when an injection timing is constant, an injection field pressure at the injection timing changes due to a change in the injection field pressure by an operating condition. A flow characteristic in fuel injection valve 3 changes in association with the change in the injection field pressure to be applied.

Figure 3:
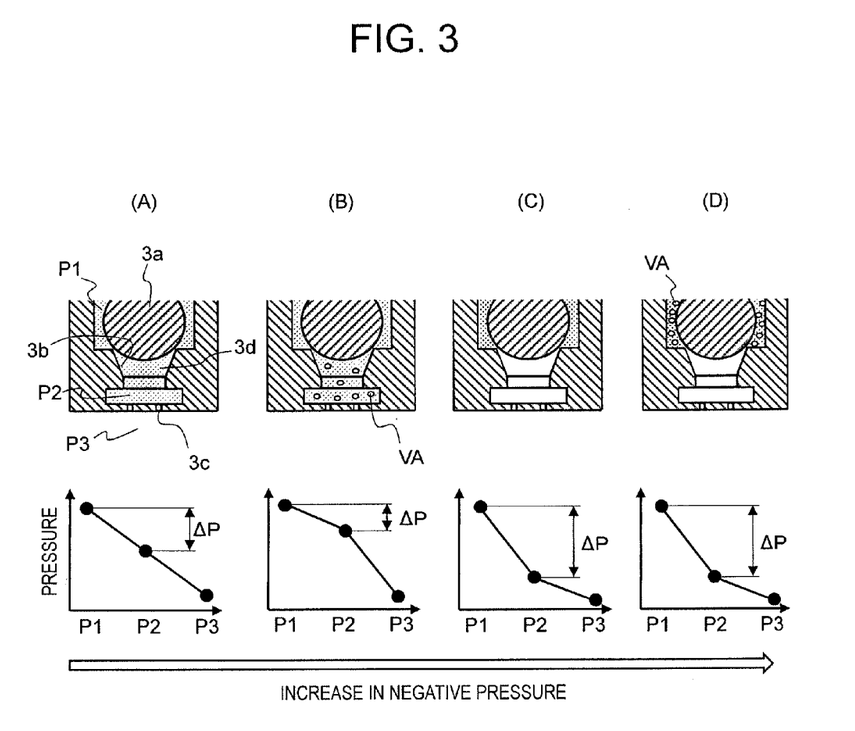
FIGS. 3A to 3D are views illustrating a relationship between a pressure and a state of fuel accumulating space of a fuel injection valve according to the embodiment of the invention.

As illustrated in FIG. 3, fuel injection valve 3 includes a fuel accumulating space 3d in which a fuel stays between a valve body 3a and injection holes 3c, and a change in flow characteristic due to a change in injection field pressure occurs by a vaporization state and the like of the fuel staying in fuel accumulating space 3d.

Accordingly, the correction value THOS is calculated to compensate for a fluctuation of a fuel injection amount due to an injection field pressure at an injection timing, that is, a pressure within inlet port 2a at an injection timing.

FIG. 3 is a view illustrating an example of a case in which a flow characteristic of fuel injection valve 3 changes due to an influence of an injection field pressure, and illustrates a relationship between a pressure state and a state of fuel accumulating space 3d of fuel injection valve 3 for each injection field pressure.

In addition, FIG. 3 illustrates a fuel injection valve using a spherical valve body as an example of a structure of fuel injection valve 3.

Fuel injection valve 3 illustrated in FIG. 3 is in a closed state when spherical valve body 3a sits on a valve seat 3b formed in a funnel shape so as to taper off toward a downstream side, and is in an open state when valve body 3a is lifted and separated from valve seat 3b by a magnetic attractive force of a magnet coil (not illustrated). In the open state, a fuel passes through a void between valve body 3a and valve seat 3b, and flows into fuel accumulating space 3d between valve body 3a and injection holes 3c, and the fuel is injected from injection holes 3c.

Herein, FIGS. 3A to 3D illustrate a state change within fuel accumulating space 3d due to a difference in injection field pressure P2, and an accompanying change in differential pressure ΔP of valve body 3a between before and after the state change. The injection field pressure P2 indicates a lower state from FIG. 3A toward FIG. 3D.

FIG. 3A illustrates a state in which a fuel vapor VA is not generated in fuel accumulating space 3d, the pressure P2 within fuel accumulating space 3d is higher than an injection field pressure P3, and a pressure P1 on an upper stream side of valve body 3a is higher than the pressure P2 within fuel accumulating space 3d.

When the injection field pressure P3 decreases while the closed state of fuel injection valve 3 is maintained from the state illustrated in FIG. 3A, as illustrated in FIG. 3B, a pressure of fuel accumulating space 3d decreases, so that a fuel easily vaporizes, and the fuel vapor VA is generated in a fuel staying in fuel accumulating space 3d.

When the fuel vapor VA is generated in the fuel staying in fuel accumulating space 3d, the pressure P2 within fuel accumulating space 3d increases. When the pressure P2 within fuel accumulating space 3d increases, a differential pressure ΔP between the pressure P1 on an upstream side of valve body 3a and the pressure P2 within fuel accumulating space 3d decreases when compared to a case in which the fuel vapor VA is not generated, which is illustrated in FIG. 3A. When a fuel injection is started in the state in which the differential pressure ΔP decreases, a flow rate of fuel injection valve 3 decreases when compared to a case in which the fuel vapor VA is not generated.

In addition, when the injection field pressure P3 further decreases from the injection field pressure P3 at which the fuel vapor VA is generated in fuel accumulating space 3d, a fuel within fuel accumulating space 3d is drawn out from injection holes 3c into inlet port 2a as illustrated in FIG. 3C. Therefore, the pressure P2 within fuel accumulating space 3d is equal to the injection field pressure P3, and the differential pressure ΔP increases as the injection field pressure P3 decreases. Accordingly, when a fuel injection is performed in the state illustrated in FIG. 3C, a flow rate of fuel injection valve 3 increases when compared to a case in which a fuel containing the fuel vapor VA stays in fuel accumulating space 3d.

In addition, when the injection field pressure P3 further decreases from the injection field pressure P3 at which the fuel within fuel accumulating space 3d is drawn out through injection holes 3c, a pressure of the inside of a fuel passage on an upstream side of valve body 3a decreases when fuel injection valve 3 is opened, and the fuel vapor VA is generated as illustrated in FIG. 3D. In this way, a density of a fuel injected from fuel injection valve 3 decreases to decrease a flow rate, so that the differential pressure ΔP is large. However, a flow rate of fuel injection valve 3 decreases when compared to a case in which the fuel vapor VA is not generated within the fuel passage on an upstream side of valve body 3a.

Figure 4:
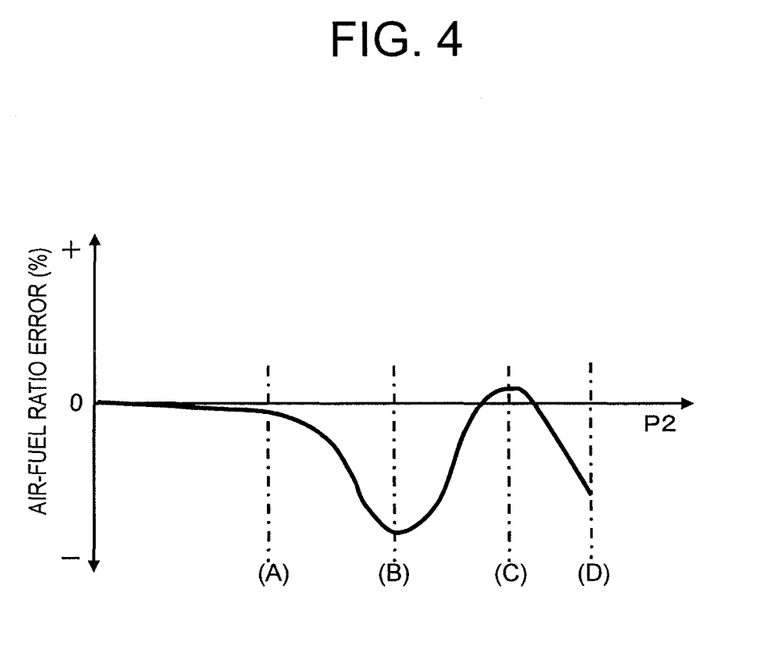
FIG. 4 is a view illustrating a relationship between an injection field pressure and an air-fuel ratio error according to the embodiment of the invention.

When a flow rate fluctuation occurs by an injection field pressure as described above, an air-fuel ratio error occurs in response to a difference in injection field pressure as illustrated in FIG. 4. Furthermore, in a case of an injection field pressure at which the fuel vapor is generated within fuel injection valve 3, an actual fuel injection amount is less than an indicated value, and an air-fuel ratio becomes lean.

In this way, a state in fuel accumulating space 3d changes by injection field pressure P2 at an injection timing, which entails a change in the differential pressure ΔP, and thus a flow characteristic of fuel injection valve 3 changes. In this way, even when an injection pulse signal having the same injection pulse width is input to fuel injection valve 3, a fluctuation occurs in an amount of fuel that is actually injected.

In addition, the fluctuation in the fuel injection amount increases as a volume of fuel accumulating space 3d increases, and the fluctuation further increases an error of an air-fuel ratio.

Herein, a fluctuation in a fuel injection amount due to a difference in injection field pressure P2 has a high correlation with injection field pressure P2 at an injection starting timing. Thus, injection field pressure P2 at the injection starting timing IS is detected, and the correction value THOS is calculated according to injection field pressure P2.

Figure 5:
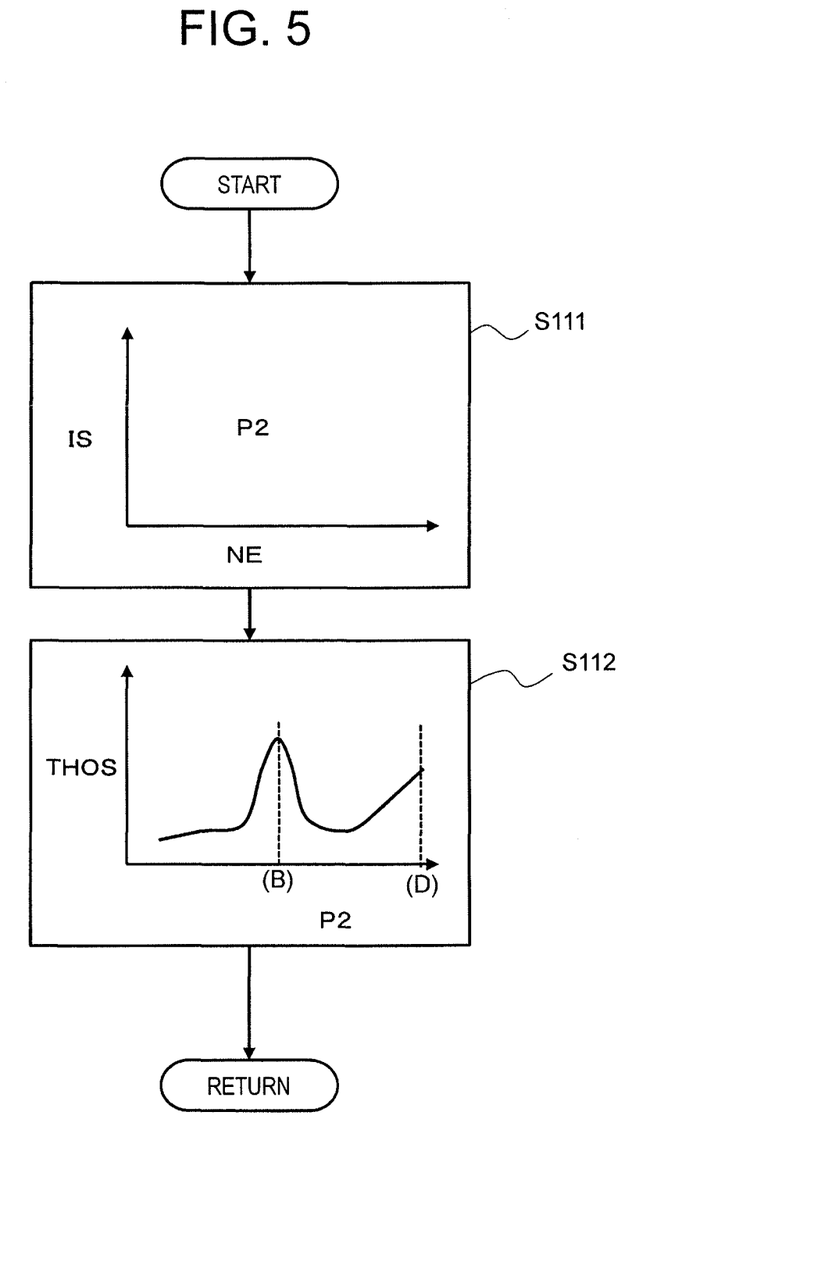
FIG. 5 is a flowchart illustrating a calculation of a correction value of a pulse width according to the embodiment of the invention.

Specifically, in step S104, the correction value THOS is set as illustrated in a flowchart of FIG. 5.

The routine illustrated in the flowchart of FIG. 5 is executed by ECM 31 for every given period of time. First, in step S111, an injection field pressure at the injection starting timing IS is calculated based on the engine rotation speed NE and the injection starting timing IS.

The engine rotation speed NE correlates with a phase and an amplitude of a change in injection field pressure P2. Furthermore, an injection field pressure at the injection starting timing IS is estimated by specifying a crank angle position that estimates an injection field pressure based on the injection starting timing IS.

Herein, the injection field pressure at the injection starting timing IS is estimated as a difference with respect to a reference value. The injection pulse width TI is calculated as a value that may generate an air-fuel mixture of a target air-fuel ratio when an injection field pressure is the reference value.

In subsequent step S112, the correction value THOS corresponding to an injection field pressure at the injection starting timing IS obtained in step S111 is searched for with reference a table that stores the correction value THOS for each injection field pressure in advance.

The correction value THOS is set to a correction value of the injection pulse width TI for obtaining a target air-fuel ratio by an experiment or a simulation in advance for each injection field pressure at the injection starting timing IS.

For example, in a case in which when an injection field pressure is a pressure at which a vapor is generated in a fuel on an upstream side of the valve body of fuel injection valve 3 is set to the injection starting timing IS, the correction value THOS which is an addition term with respect to the injection pulse width TI is set to a greater value when compared to a case in which a fuel vapor is not generated to compensate for a decrease in fuel density due to the generation of a vapor. That is, when an injection field pressure at an injection timing is a pressure at which a vapor is generated in the fuel passage on an upstream side of the valve body of fuel injection valve 3, a pulse width of a pulse signal that commands an opening period of fuel injection valve 3 is increased, and the opening period is extended.

In addition, in a case of the injection starting timing IS and an injection field pressure at which a fuel injection is started in a state in which a vapor is generated in a fuel within fuel accumulating space 3d, the correction value THOS which is an addition term with respect to the injection pulse width TI is set to a greater value when compared to a case in which a fuel vapor is not generated so as to compensate for a decrease in differential pressure of the valve body between before and after the state changes. That is, when an injection field pressure at an injection timing is a pressure at which a vapor is generated in a fuel staying in fuel accumulating space 3d, a pulse width of a pulse signal that commands an opening time of fuel injection valve 3 is increased, and the opening period is extended.

When the correction value THOS is set as described above in step S104 of the flowchart of FIG. 2, a result obtained by adding the correction value THOS to the injection pulse width TI is set to a final injection pulse width TIL in subsequent step S105.

In step S106, it is determined whether or not it is the injection starting timing IS calculated in step S103. When it is the injection starting timing IS, the process proceeds to step S107.

In step S107, an injection pulse signal of the injection pulse width TIL, that is, a pulse signal as a command signal that controls an opening period of fuel injection valve 3, is input to fuel injection valve 3 provided in a cylinder at the injection starting timing IS.

Setting processing of the correction value THOS in step S104 is not limited to processing illustrated in the flowchart of FIG. 5, and may be implemented by various different embodiments without departing from the scope of the technical idea, which includes changing a command signal of a fuel injection amount from fuel injection valve 3 according to an injection field pressure at an injection timing of fuel injection valve 3.

Figure 6:
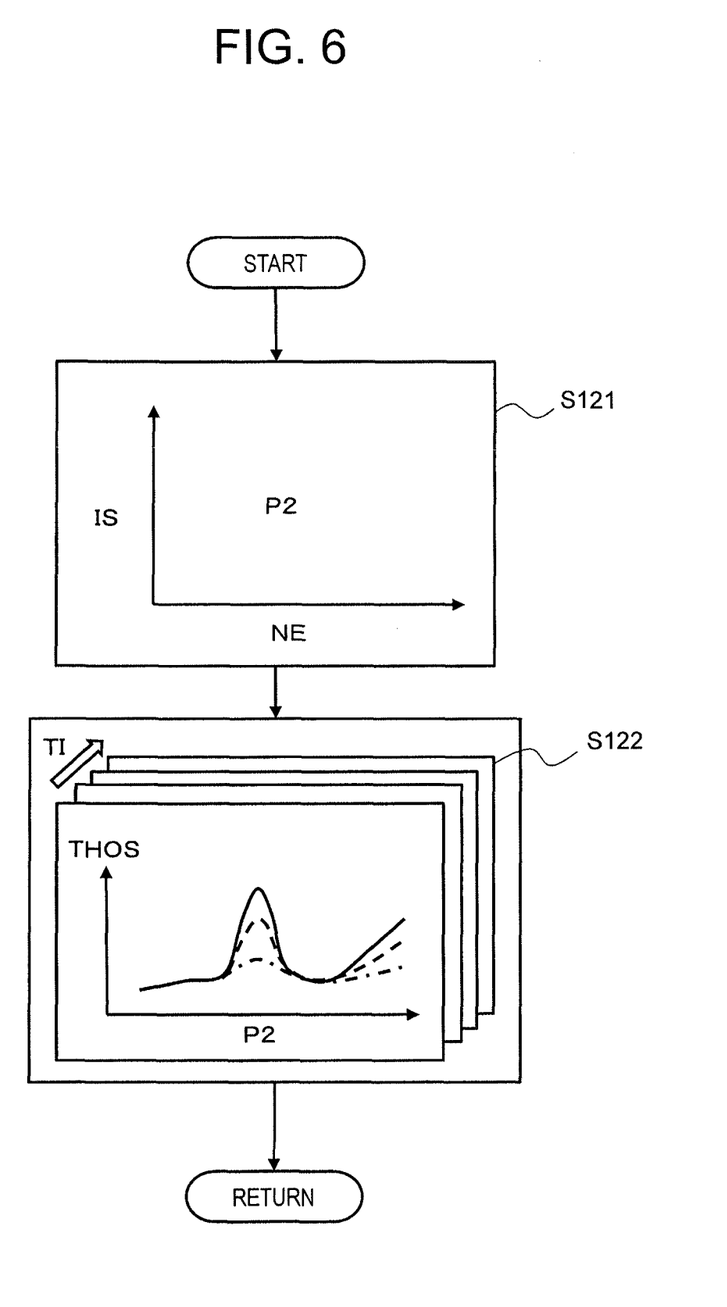
FIG. 6 is a flowchart illustrating a calculation of a correction value of a pulse width according to the embodiment of the invention.

For example, in a flowchart of FIG. 6 illustrating another example of arithmetic processing in step S104, the correction value THOS is changed according to the injection pulse width TI, that is, an engine load.

In the flowchart of FIG. 6, first, in step S121, an injection field pressure at the injection starting timing IS is calculated based on the engine rotation speed NE and the injection starting timing IS similarly to step S111.

In step S122, the correction value THOS is determined based on the injection pulse width TI and the injection field pressure at the injection starting timing IS obtained in step S121.

In step S122, for the same injection field pressure, the correction value THOS is set to a smaller value as the injection pulse width TI is longer, that is, as a command value of a fuel injection amount is greater. That is, in step S122, an amount of change of a command signal corresponding to an injection field pressure is changed according to a magnitude of the command signal, and the amount of change of the command signal (that is, the correction value THOS) is smaller as the command signal is larger (that is, a pulse width of an injection pulse signal is longer).

The reason is that as the injection pulse width TI is longer, less fluctuation of injection amount by an injection field pressure at an injection starting timing accounts for the entire injection amount, and an air-fuel ratio error in a state in which a correction by the correction value THOS is not performed is smaller.

In this way, when an amount of change of the injection pulse width TI corresponding to an injection field pressure is set to a smaller value as the injection pulse width TI is longer, an air-fuel ratio error may be sufficiently suppressed at a small value even under conditions in which the injection pulse width TI is different.

A fuel injection by fuel injection valve 3 may be performed by fixing the injection starting timing IS. When the injection control is performed, an injection field pressure at the injection starting timing IS may be obtained from the engine rotation speed NE, or the engine rotation speed NE and the injection pulse width TI.

In addition, without calculating the injection ending timing IE, an injection control may be performed such that the injection starting timing IS is set to be variable according to an engine operating condition, and the injection ending timing IE is changed by an injection pulse width.

That is, the injection starting timing IS may be fixed and may be varied. Various types of known processing may be appropriately adopted as processing for setting the injection starting timing IS to be variable.

In addition, an injection field pressure at the injection starting timing IS varies due to an influence of a valve opening characteristic such as a valve timing and an operating angle of intake valve 4, an exhaust reflux volume by an exhaust reflux device, and an operating condition of an intake control valve such as a tumble control valve provided in inlet port 2a.

Accordingly, in an internal-combustion engine including at least one of an inlet control valve, an exhaust reflux device, and a variable valve mechanism that varies a valve opening characteristic of intake valve 4, an injection field pressure at the injection starting timing IS may be obtained from a combination of an engine rotation speed and at least one of a valve opening characteristic of intake valve 4, an exhaust reflux volume, and an operating condition of an inlet control valve.

Furthermore, instead of determining the correction value THOS according to the injection pulse width TI, for example, the correction value THOS may be set in a case of a low load range including an idle operating range, and a correction of the injection pulse width TI by the correction value THOS may be canceled in a high load range.

In addition, step processing of determining the correction value THOS based on an injection field pressure after obtaining the injection field pressure at the injection starting timing IS may be simplified, and for example, the correction value THOS may be determined from the injection starting timing IS and the engine rotation speed NE.

In addition, it is possible to provide a pressure sensor that detects a pressure within an inlet port, and detect an injection field pressure at the injection starting timing IS of each cylinder based on an output of the pressure sensor.

The entire contents of Japanese Patent Application No. 2012-163521, filed Jul. 24, 2012, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention, the invention as claimed in the appended claims and their equivalents.

What is claimed is:

1. An apparatus for controlling an internal-combustion engine, the internal combustion engine including a fuel injection valve that injects a fuel into an inlet port, the fuel injection valve including a fuel accumulating space between a valve body and injection holes thereof, the apparatus comprising:
   an injection control unit for controlling an amount of fuel injection through the fuel injection valve by changing a pulse width of an injection pulse signal input to the fuel injection valve, wherein the injection control unit includes:

a first estimating circuit configured to estimate a difference of a pressure within the inlet port with respect to a reference value at an injection starting timing of the fuel injection valve based on a rotation speed of the internal combustion engine and the injection starting timing of the fuel injection valve;

a second estimating circuit configured to estimate whether fuel injection is performed in a state in which fuel vapor is generated at the fuel injection valve, based on the difference; and a correcting circuit configured to correct the pulse width of the fuel injection pulse signal to be increased when it is estimated that fuel injection is performed in the state in which fuel vapor is generated at the fuel injection valve.

2. The apparatus for controlling an internal-combustion engine according to claim 1, wherein the first estimating circuit detects a phase and an amplitude of pressure change in the intake port based on the rotation speed of the internal-combustion engine.

3. The apparatus for controlling an internal-combustion engine according to claim 1, wherein the second estimating circuit estimates whether or not fuel injection is started in the state in which a vapor is generated in a fuel staying in the fuel accumulating space of the fuel injection valve.

4. The apparatus for controlling an internal-combustion engine according to claim 1, wherein the second estimating circuit estimates whether or not fuel injection is started in the state in which a vapor is generated in a fuel staying upstream the valve body of the fuel injection valve.

5. The apparatus for controlling an internal-combustion engine according to claim 1, wherein the correcting circuit sets the increase correction value to a smaller value as the injection pulse width is longer.

6. An apparatus for controlling an internal-combustion engine, the internal combustion engine including a fuel injection valve that injects a fuel into an inlet port, the fuel injection valve including a fuel accumulating space between a valve body and injection holes thereof, the apparatus comprising:

injection control means for controlling an amount of fuel injection through the fuel injection valve by changing a pulse width of an injection pulse signal input to the fuel injection valve, wherein the injection control means includes:

first estimating means for estimating a difference of a pressure within the inlet port with respect to a reference value at an injection starting timing of the fuel injection valve based on a rotation speed of the internal combustion engine and the injection starting timing of the fuel injection valve;

second estimating means for estimating whether fuel injection is performed in a state in which fuel vapor is generated at the fuel injection valve, based on the difference; and correcting means for correcting the pulse width of the fuel injection pulse signal to be increased when it is estimated that fuel injection is performed in the state in which fuel vapor is generated at the fuel injection valve.

7. A method for controlling an internal-combustion engine, the internal combustion engine including a fuel injection valve that injects a fuel into an inlet port, the fuel injection valve including a fuel accumulating space between a valve body and injection holes thereof, the method comprising:

estimating a difference of a pressure within the inlet port with respect to a reference value at an injection starting timing of the fuel injection valve based on a rotation speed of the internal combustion engine and the injection starting timing of the fuel injection valve;

estimating whether fuel injection is performed in a state in which fuel vapor is generated at the injection fuel valve, based on the difference; and correcting the pulse width of the fuel injection pulse signal to be increased when it is estimated that fuel injection is performed in the state in which fuel vapor is generated at the fuel injection valve.

8. The method for controlling an internal-combustion engine according to claim 7, wherein the estimating the difference includes: detecting a phase and an amplitude of pressure change in the intake port based on the rotation speed of the internal-combustion engine.

9. The method for controlling an internal-combustion engine according to claim 7, wherein the estimating whether or not fuel injection is performed in a state in which the fuel vapor is generated includes: estimating whether or not fuel injection is started in the state in which a vapor is generated in a fuel staying in the fuel accumulating space of the fuel injection valve.

10. The method for controlling an internal-combustion engine according to claim 7, wherein the estimating whether or not fuel injection is performed in a state in which the fuel vapor is generated includes: estimating whether or not fuel injection is started in the state in which a vapor is generated in a fuel staying upstream the valve body of the fuel injection valve.

11. The method for controlling an internal-combustion engine according to claim 7, wherein the correcting the pulse width to be increased includes setting the increase correction value to a smaller value as the injection pulse width is longer.

* * * * *